US007003669B2

(12) United States Patent
Monk

(10) Patent No.: US 7,003,669 B2
(45) Date of Patent: Feb. 21, 2006

(54) DOCUMENT AND BEARER VERIFICATION SYSTEM

(76) Inventor: Bruce C. Monk, 8 Robin Dr., Hudson, NH (US) 03051

( * ) Notice: Subject to any disclaimer, the term of this patent is extended or adjusted under 35 U.S.C. 154(b) by 857 days.

(21) Appl. No.: 10/022,634

(22) Filed: Dec. 17, 2001

(65) Prior Publication Data

US 2003/0115459 A1 Jun. 19, 2003

(51) Int. Cl.
*G06F 1/26* (2006.01)

(52) U.S. Cl. ...................... 713/182; 713/168; 713/193; 713/200; 713/201

(58) Field of Classification Search ................ 713/182, 713/168, 193, 200, 201, 187–188, 177, 181; 726/22–25; 709/223–225, 229
See application file for complete search history.

(56) References Cited

U.S. PATENT DOCUMENTS 4,980,913 A * 12/1990 Skret .......................... 713/153
5,131,038 A * 7/1992 Puhl et al. ................. 340/5.61
5,343,529 A * 8/1994 Goldfine et al. .............. 705/75

* cited by examiner

*Primary Examiner*—Thomas R. Peeso
(74) *Attorney, Agent, or Firm*—Joseph E. Funk

(57) ABSTRACT

Apparatus and a method are disclosed for verifying the identity of applicants applying for documents, issued documents, and the identity of bearers of documents by obtaining information from the applicants, the documents and/or their bearers, identifying which of a plurality of secure, remote databases contain information needed to verifying the obtained information, comparing the obtained information with information stored in the identified database(s) to verifying the obtained information without disclosing database information to any persons, and providing an indication whether or not the obtained information matches the information from the identified database(s).

26 Claims, 3 Drawing Sheets

DOCUMENT AND BEARER VERIFICATION SYSTEM

CROSS-REFERENCE TO RELATED APPLICATION

This application is related to U.S. patent application Ser. No. 09/994,399 filed Nov. 26, 2001, entitled "Validation And Verification Apparatus And Method" which is incorporated herein by reference.

FIELD OF THE INVENTION

This invention relates to apparatus and a method for validating the identity of a bearer of a document, and for comparing information on the document against information in databases to determine if there are any other known concerns about the document or its bearer.

BACKGROUND OF THE INVENTION

In the prior art terminals have been used to read and verify different types of documents, including identity and/or travel documents. Over the years alteration and counterfeiting of such documents has been increasing and, to counter same, features had been incorporated into the documents to make it very difficult if not impossible to alter or counterfeit documents.

To hinder such counterfeiting and alterations to identity, travel and similar documents, and documents having value, many innovations have been proposed or introduced. One solution has been the development and implementation of new materials for producing such documents that has made counterfeiting and alterations more difficult, and the detection of counterfeit and altered documents easier and faster. Such new materials include the use of holograms and retro-reflective layers in laminating material, invisible information that only appears when illuminated by certain wavelengths of invisible light or other energy, and different types of inks that are seen as one color under normal ambient light but are seen as a different color when illuminated by certain wavelengths of invisible light or other energy (chemical taggants). In addition, magnetic and radio frequency (RF) taggants that are invisible to the eye are added to base materials and laminating materials but may be detected using special equipment. Further, micro-miniature smart chips and memory chips are embedded in such documents, just as they are in smart cards, and may be used to identify, read and validate documents in which they are embedded, and to identify and validate the bearer of such documents.

One example of a security laminating material used for anti-counterfeiting of passports is 3M's Confirm® security laminate described in U.S. Pat. No. 5,658,411. Another example of a 3M security laminating material used for anti-counterfeiting of passports is described in U.S. Pat. No. 5,631,064 and utilizes retro-reflective glass microspheres.

An example of an identity card using smart-card technology has recently been introduced in Malaysia where an embedded computer chip and memory allows the card to be used as a combination identity card, driver's license, cash card, national health service card, and passport.

Coupled with the increase of new materials and new techniques to produce documents that are more difficult to counterfeit or alter, there has been an increase in the demand for new equipment and systems for automatically identifying and validating documents, for validating the identity of a bearer of a document, for verifying that the bearer has authorization to participate in an activity represented by the document, for comparing information on the document against information databases, and to determine if there are any other known concerns about the document or its bearer. This demand has risen because it has become virtually impossible for a person, by them self, to analyze and validate documents using such new materials and other techniques.

Accordingly, features have been added to terminals used to read documents to validate and verify the documents and their bearers such as described in the related patent application cited above.

However, criminals and terrorists may have been issued valid identity and/or travel documents prior to becoming a criminal or being identified as a terrorist, or such documents are being wrongfully issued by corrupt officials in some countries to criminals and terrorists for a fee and they are usually issued with wrong names and other information. When investigating the terrorists who performed the acts of Sep. 11, 2001 it was found that some of them had multiple false, but valid passports in different names and from different countries.

In addition, some individuals steal the identity of other individuals by first obtaining duplicate birth certificates and other documents and records that are then used to fraudulently obtain "valid" documents, such as passports and identity cards including national identity cards. Accordingly, validation and verification terminals designed to detect altered and counterfeit identity and/or travel documents will not detect such "valid" documents wrongfully issued to and used by criminals and terrorists.

SUMMARY OF THE INVENTION

In the aftermath of the terrorist acts of Sep. 11, 2001 much attention has been devoted to security with public approval of increased security measures at the expense of convenience and personal privacy. Much money has been spent and will be spent by both governments and private business to provide increased security as soon as possible.

One possible solution that has received a lot of attention involves implementation of a national ID system with a centralized database. Highly expensive, it would provide little improvement in positive identification unless it is accompanied by a totally new identity verification infrastructure to overcome the deficiencies of our current system—deficiencies that include the complex issues of illegal immigration, identity fraud, "valid" documents fraudulently obtained, and individuals who are wanted or who on watch lists but carry valid documents. Such a centralized national ID system would probably require many years to complete—provided that "privacy" litigation did not delay or halt the development and implementation of such a system altogether.

A more practical path to improved security involves the use of currently existing identification, travel and other documents, and the distributed databases (knowledgebase) that relate to them or the document bearer. This knowledge base includes, but is not limited to, information collected for the issuance of: state drivers license, identity cards, birth and death records, passports and visas and Social Security cards. This knowledgebase also includes, but is not limited to, information collected and retained in the normal course of commerce such as: transportation reservation and check-in, credit checking, employment history, banking, school enrollment, and military service. This knowledgebase also includes a large variety of law enforcement databases, but is not limited to, information such as; "wanted" and "watch" lists maintained by state and federal law enforcement and intelligence agencies, prison/arrest records, criminal profiles, and similar information maintained by foreign governments/organizations. Utilizing automated "smart" imaging devices, biometric data obtained locally from a document and/or directly from the bearer of the document, and a privacy protecting ID information routing and query system focused on risk assessment, the major components of this approach could be in placer relatively quickly. This will offer immediate improvements to security, speed, and cost over the manual methods now in use. As information "trust authorities" come on-line to provide real-time yes/no/maybe document and bearer validation evaluation, ID verification would be enhanced exponentially. "Watch" lists and privacy protecting "smart" pattern recognition technologies would provide cross-database risk assessment. As the public issues surrounding biometric identification methodologies are resolved, verification would become even more comprehensive.

ID verification is also an essential component in the ongoing battle against fraud including fraud resulting from identity theft. The global financial loss associated with all such fraud is estimated to be nearly a trillion dollars per year. According to Interpol, fraud ranks as the second largest crime problem worldwide. Annual losses for counterfeit goods are estimated at more than US$250 billion, and losses due to document fraud and counterfeiting (checks, credit cards, currency, etc.) are estimated at more than $400 Billion. The savings that would accrue from fraud reduction should more than pay for needed security improvements, and the more we automate the process, the greater the savings will be.

Currently there are substantial problems in confirming that an individual is not operating under an assumed or stolen identity. We have a system of birth certification that varies from state to state, and sometimes from county to county. In most cases, there are few controls on the issuance of a duplicate certificate or on the verification of the person who it is being issued to.

Even with the capability of some document and bearer validation and verification terminals to detect counterfeit and altered documents, such as identity documents and passports, and to verify the identity of the bearer of such a document using biometric information stored on such documents, valid identity and travel documents are wrongfully being issued by corrupt officials in some foreign governments to criminals and terrorists. To detect otherwise valid identity and travel documents wrongfully issued to criminals and terrorists other techniques are needed to identify these individuals, such as, but not limited to, the use of watch lists of wanted individuals, known or suspected terrorists, determine if individuals are on prohibited entry lists, and to determine if there are known concerns about a document or its presenter. Such information is not found on travel, identity or other documents and this information must be checked, using the novel document validation and verification system disclosed and claimed herein, against databases, where it has been collected and stored.

In addition, some individuals steal the identity of other individuals by first obtaining duplicate birth certificates and other documents and records that are then used to fraudulently obtain other valid higher quality documents, such as passports and identity cards including national identity cards. Individuals carrying fraudulently obtained documents may only be identified by checking existing databases for indications such as the document is issued to a person who appears in death records, or there is a discrepancy between the apparent age of a person carrying a document and age information appearing in different databases, or there are no birth, medical, the other records in databases for an individual named on a document. All such discrepancies provide a warning indication that the individual being checked should be subjected to special scrutiny.

The number of new, valid documents, such as passports and identity cards, that are wrongfully issued associated with identity theft will be minimized by using my novel document validation and verification system. Fraudulently obtained "original" documents, biometric information, and other information submitted by a person to fraudulently obtain the new documents may be checked, in accordance with the teaching of the invention, against information stored in the plurality of aforementioned databases before the new documents are issued. While a person attempting to steal another person's identity may have fraudulently obtained a duplicate birth certificate and a driver's license for the other person, and obtained some private information about the other person, there is usually other information about the other person that cannot be obtained and that will be requested upon application for the new documents. Failure to provide such other information will immediately raised concerns. In addition, submission of false information will be detected when the information is verified against various databases, and appropriate action will be taken with respect to the person attempting to obtain the new documents to determine if they are fraudulently attempting to do so. By using the novel verification system taught and claimed herein, with minimal or no human intervention, and only "match"/"no match" given in response to information verification comparisons, privacy issues are adequately addressed.

The databases are presently created and maintained by the issuing authority for each document type and by other organizations that have the control authority or operational charter to do so as a part of their business model. New trust authorities authorized to access such databases would be used to access the databases using standardized privacy protected ID data routing, and a query/response system focused on risk assessment. That is, the trust authority server for a database will compare information, such as a birth date retrieved from a submitted document against the birth date stored in its associated database and return a response of match or no match to the remote terminal that initiated the inquiry for a birth date match. Alternatively, the match could be made at a server for the verification terminals. In this manner privacy issues are adequately addressed since there is usually no human access to the database contents from the verification terminals.

For example, the U.S. State Department maintains a database for passports that it issues, and states maintain databases for drivers' licenses and identity cards that they issue. Such databases typically include, or may include, document numbers, the identity of the issuing authority of the document, biographical information, and biometric information including a photograph, fingerprints, iris scans and other such information. Only in very special circumstances would information retrieved from a database, such as a photo, not be matched at the associated trust authority server but instead returned to the validation and verification terminal that made the request for manual comparison with the document presenter. This might occur if there has been a substantial change in appearance and the comparison against the document is inconclusive. Even in this instance, the most often used approach will be to send the biometric data from the presenters "live" photo to the trust authority for comparison rather than have the less capable terminal operator do the comparison.

In addition, there are instances when validation and verification systems cannot accurately determine if a document is valid, such as results when there are scratches or discoloration on the face of the document. As a result, information that can be accurately retrieved from a document, such as an identity or travel document, is used to check against other information stored in a trust authority database controlled by the issuing authority that issued the document, the evaluation of the information match is returned via the trust authority server to the verification terminal that made the request, and the information is then evaluated along with information from other sources to evaluate the associated risk and what further action is appropriate. For example, if there is an operator at the terminal the bearer can be questioned to compare information with that on the document being checked to further determine if a document is valid and to verify the identity of its bearer.

For example, under special circumstances, such as in the case of a lost or stolen ID, the presenter may authorize that a photo and information be retrieved from a centralized database so that it may be compared to them in lieu of the actual document.

A photo on a document may be captured with sufficient quality to be sent to a trust authority server where it is compared with a stored photo using facial matching technology backed-up by a service attendant. However, this is not required in most instances since image process techniques can be used to derive a "code" that represents the photo as a graphic that can be compared by the trust authority to like code derived from the original used to create the document. Thereby, no biometric information needs to be exchanged for most transactions. A picture, signature, fingerprint, iris scan or other biometric information stored on a document may be compared to biometric information received directly from the bearer of the document, and/or may be compared at a trust authority server to biometric information retrieved from their database. Also, the information obtained from a document and the presenter of the document may be checked against information stored in other local or distributed databases, such as "watch" lists, "wanted" lists, prohibited entry lists, and to determine if there are any other known concerns about a document or its presenter. In this manner, both false identities and identity theft are detected. The certainty of detection then becomes a major deterrent to such crimes and the movement of international terrorists.

DESCRIPTION OF THE DRAWING

The invention will be better understood upon reading the following Detail Description in conjunction with the drawing in which.

DETAILED DESCRIPTION

Figure 1:
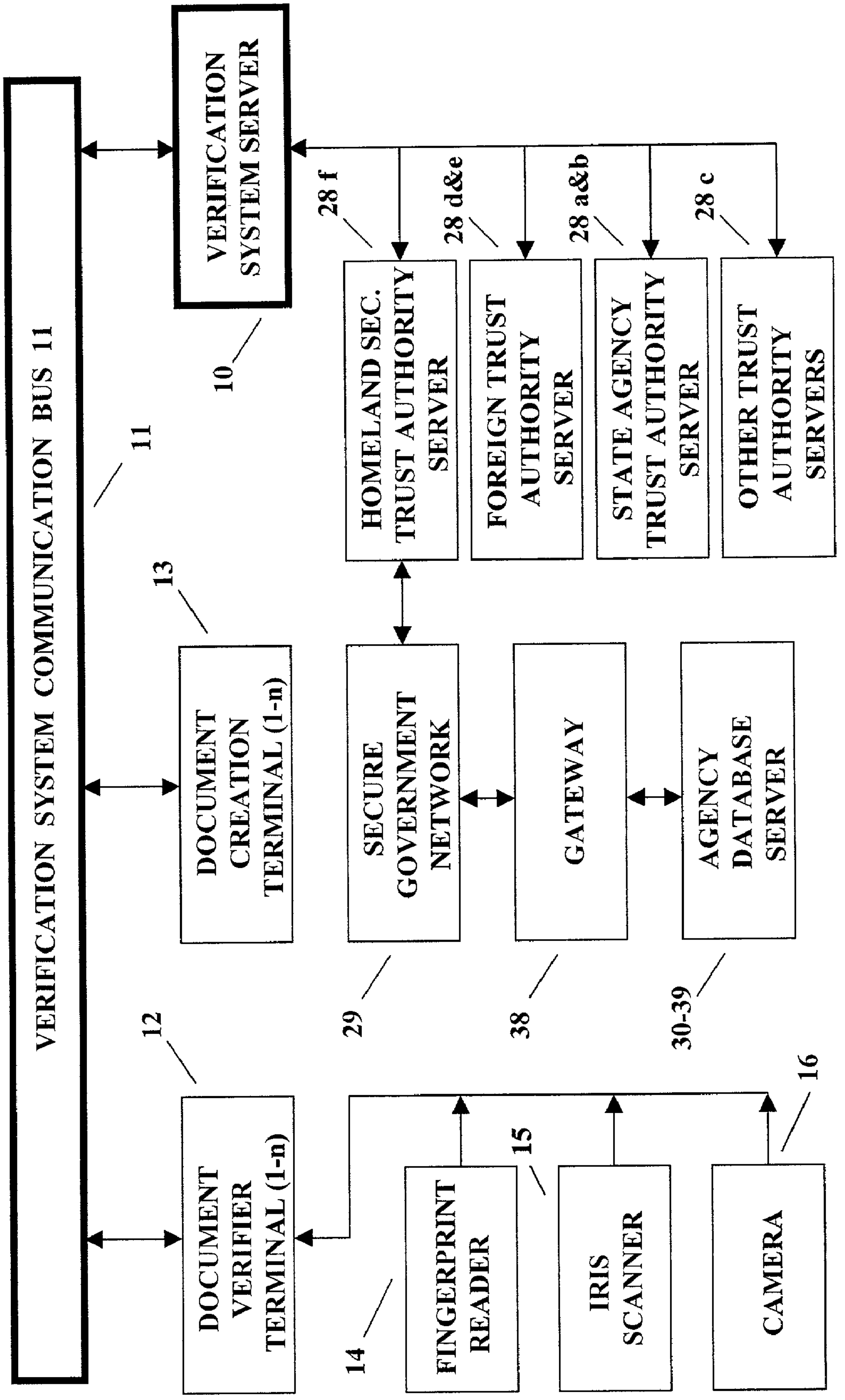
FIG. 1 is a general block diagram of a plurality of document verification and document creation terminals working in conjunction with a network of trust authorities to verify information submitted when applying for documents, and to verify issued documents and individuals to whom they are issued.

Better equipment for verifying submitted information, and verifying issued documents by checking to determine if they are counterfeit or have been altered will not provide much improvement in positive identification of individuals unless it is accompanied by a new identity verification infrastructure to overcome the deficiencies of our current system—deficiencies that have allowed identity theft to become prevalent. Identity theft is too common due to the ease in fraudulently obtaining a driver's license, state identity card, birth certificate, and Social Security number and then using those documents as proof of identity to obtain other documents such as a passport or national ID card.

An application for a minor to receive a Social Security number requires only the testimony of a parent. A driver's license, state identification card, passport or work permit are all linked to the birth certificate and/or the Social Security number. Therefore, no positive biometric link exists to the person who obtains the documents.

The certification/notification of death is even more poorly controlled. There is no flag placed on a birth record and, unless a deceased person has been collecting a Social Security benefit and Social Security was notified of the death, there is no retirement of the person's Social Security number or prevention of someone from assuming the identity of the deceased.

Even the new alien residence card has little true security since there is no comprehensive process for verification that it was legitimately issued to the bearer. In addition, there is no accountability placed upon employers to authenticate the document or to verify that the bearer is the person to whom the document was issued. This high-security card has had little impact on "green card" forgery since earlier "green card" issues were never recalled and are therefore still accepted for identification. Hence, why forge the more secure card when a forgery of the old card works just as well?

Until the tragic events of Sep. 11, 2001, the American people were not willing to accept a loss of personal privacy for any reason. This attitude has changed as reflected by current polls and the passage of new antiterrorist laws getting broader powers to law enforcement authorities. Personal privacy has decreased for now, and it is not known how long will this be accepted.

At the heart of a proposed national ID system is a centralized database, and without a doubt this raises the specter of "big brother" to the public. There are legitimate concerns, of course, over the centralized collection of information and the potential dissemination of personal preferences, lifestyle choices, and data that can be used to target people for crime, abuse, or unsolicited marketing efforts. However, these concerns are somewhat irrational when we consider that much of our personal information can be found in databases that are presently in less reliable hands than the government.

The truth is that a time in history has been reached when it is probably best to entrust our government with our identity and its protection. Concealment of true identity is a key element in the success of most illegal activities, and the lack of a positive means for establishing identity provides the opportunity for others to assume our identity. Forcing a positive identity confirmation for any transaction or interaction being carried out in our name actually protects us—and society—at the same time.

If done correctly, a centralized national ID database could go a long way toward improving security, but such a system requires a huge shift in the public mindset. Not only would it take more than a few years to implement (some estimates as high as 10 years), but also privacy litigation could easily delay or halt a new system altogether.

A more practical way to achieve increased security would involve the use of currently existing global identification documents and the distributed databases that to them, where access to and data from the databases are controlled by new trust authorities, and privacy concerns are adequately addressed by greatly limiting dissemination of information from these databases. For one example, a trust authority server for a database will compare a birth date retrieved from a submitted document against the birth date stored in the server's associated database and return a response of "match" or "no match" to the remote verification terminal that initiated the inquiry for a birth date match.

Utilizing automated smart imaging devices, local biometric data, and a privacy protecting ID data routing and query system focused on exception reporting, major components of this approach could be in place within months, offering immediate automated improvements to security, speed, and cost over the manual methods now in use.

Standardized communication protocols would provide real-time yes/no/maybe type document inquiry results on-line from appropriate database trust authorities. Watch list and privacy-protecting smart pattern recognition technologies would provide cross database exception reporting to further improve security, and as the public issues surrounding biometric identification methodologies are resolved, positive verification would become even more comprehensive.

There are four major elements to implementing such a system: (1) data collection at the transaction point by a verification terminal or other apparatus associated therewith, (2) local data analysis by the verification terminal, (3) real time document inquiry by verification terminals to a distributed knowledgebase, and (4) "smart" agent risk assessment at a trust authority server and/or a verification terminal server and/or a plurality of verification terminals. The cited patent application addresses elements 1 and 2. The present invention addresses elements 3 and 4.

FIG. 1 shows a general block diagram of a plurality of document creation terminals 13 (1–n) and document verification terminals (1–n) 12 connected together in a verification system and working in conjunction with a network of trust authorities to verify the identity of individuals and information they submit when applying for issuance of new documents ("document applicant"), and to later verify issued documents and the individuals to whom they are issued. The document creation terminals 13 and document verifier terminals 12 are all connected via a verification system communication bus 11 to a verification system server 10 that is used to access a plurality of trust authority servers 28*a–f* to verify information, documents and individuals.

Shown attached to document verifier/validation terminal 12 are a fingerprint reader 14, iris scanner 15, and a camera 16. Depending upon the specific application of a terminal 12 some or all of these attachments may not be provided. In addition, although not shown in FIG. 1, document creation terminal 13 may have ones of a fingerprint reader 14, iris scanner 15, and a camera 16 attached thereto to gather biometric information from an applicant for a new document to be used in verifying the identity of the applicant.

The aforementioned databases are presently created and maintained by the issuing authority for each document type and by other organizations that have the control authority or operational charter to do so as a part of their business model. New trust authorities authorized to access such databases would be used to access the databases using standardized privacy protected ID data routing, and a query/response system focused on risk assessment. That is, the trust authority server for a database will compare information, such as a birth date retrieved by a document verifier terminal 12 from a submitted document against the birth date stored in its associated database and return a response of "match" or "no match" to the remote terminal 12 that initiated the inquiry for a birth date verification. For another example, a trust authority server will compare other information, such as the submitted maiden name of a document applicant's mother, to such information stored in a birth record database and return a response of "match" or "no match" to a remote document creation terminal 13 that initiated the inquiry. Alternatively, in cases where databases may be accessed, but there is no trust authority server associative therewith, verification system server 10 may act as the trust authority, perform verification checks and return the same information comparison results to requesting ones of terminals 12 and 13. In this manner privacy issues are adequately addressed since there is usually no access to database contents, and actual information in the database(s) is not disclosed. In some circumstances information retrieved from a database, such as a photo, will not be matched at the associated trust authority server but may instead be returned to the document verifier terminal 12 from which the request was initiated, and an operator who made the request for the photo will perform a manual comparison of the photo retrieved from the database with the document presenter.

As previously described, depending upon the intended use of a document verifier terminal 12 or a document creation terminal 13, some terminals, such as ones of the plurality of terminals (1–n) 12, or ones of the plurality of terminals (1–n) 13, have additional equipment associated therewith. Examples are a fingerprint reader 14, and iris scanner 15, and a camera 16.

An image of a document applicant or document presenter may be captured by a camera 16 to be forwarded via verification system communication bus 11 to verification system server 10 which decides which of trust authorities 23 through 27 the image should be forwarded to be automatically compared to an image stored in the trust authority database. Using facial match technology that is well known in the art, the presenter image captured using camera 16 is compared to a presenter image stored in and retrieved from the database of the selected trust authority. The comparison is made by the trust authority and an indication of the quality of the match is returned to verification system server 10 to be returned via bus 11 to a document verifier terminal 12 or to a document creation terminal 13. In this manner the privacy of the document applicant and document presenter is preserved as previously described.

Alternatively, if a facial match cannot be positively made or refuted with any degree of certainty, the image retrieved from the database with the selected trust authority may be returned to a document verifier terminal 12 or document creation terminal 13 where an operator manually performs the facial match function. This may be necessary in instances when a document presenter has a beard or is wearing glasses and their image is changed to the point that an automatic facial match may not be made. The image of the document applicant or document presenter retrieved from the database is forwarded to the terminal 12 or 13 so that the operator thereof can manually compare the retrieved image to the document applicant or document presenter. However, normally in this case, a "live" photo is taken of the applicant or presenter and this is returned to the trust authority for manual matching by a resident identification expert.

A fingerprint reader 14 is used to capture a fingerprint of a document applicant for document presenter to be used to verify their identity, or to be compared to a fingerprint stored on the document. If further verification of the document applicant or presenter is required the fingerprint may be forwarded via verification system communication bus 11 and verification system server 10 to a trust authority to be processed in the same way as described in the previous paragraph. The fingerprint database to be utilized most likely is the FBI database and the fingerprint captured by a reader 14 is forwarded by bus 11, and server 10 to trust authority server 28*f*. Server 28*f* determines that the FBI database is to be accessed for the verification and forwards a request over secure government network 29 through gateway 38*g* to the FBI server 35 where the fingerprint for the identified document applicant or presenter is retrieved and returned to trust authority server 28*f* where it is compared to the fingerprint forwarded from document verifier terminal 12 or document creation terminal 13 and a "match" or "no match" indication is returned to verification server 10 and on to terminal 12 or 13. In instances where a terminal 12 has no fingerprint reader 14, but a fingerprint is retrieved from a presented document, the fingerprint may be verified in the manner described at the beginning of this paragraph.

Iris scanner 15 is used to capture an iris scan of a document presenter to be compared to an iris scan stored on the document. For verification of the identity of a document applicant or a document presenter the iris scan obtained using scanner 15 may be forwarded via bus 11 to verification system server 10 to be processed in the same way as described in the previous two paragraphs for facial images and fingerprints to be compared against a stored and retrieved iris scan in a database, where the comparison is performed at either the trust authority server or the verification system server 10. In instances where a terminal, such as a terminal 12, has no iris scanner 15, but an iris scan is retrieved from a presented document, the iris scan may be verified in the manner described at the beginning of this paragraph.

In some applications there may not be a requirement to perform the verification of biometric information retrieved directly from a document presenter as described in the previous paragraphs. A basic document verifier 12 may then be utilized that has no fingerprint reader 14, iris scanner 15 and camera 16. Biometric information stored on a presented document may still be verified against biometric information stored in databases as described above.

Other than information and biometric verification as described in the previous paragraphs, databases associate with trust authorities may still have to be accessed to determine a number of things including if a document applicant or a document presenter is wanted for a crime, and/or is on a watch list including a denied entry list, and/or to determine if there are known concerns about the document applicant, document or document presenter. In such cases, information submitted by the document applicant, or retrieved from the document being verified by document verifier terminal 12 is forwarded via verification system server 11 to an appropriate trust authority server for processing and an indication is returned via server 10 to terminal 12 or 13 indicating if the document applicant or document presenter is wanted for a crime, and/or is on a watch list including a denied entry list, and/or indicating any other known concerns about the document applicant, the document or its presenter.

As may be seen in FIG. 1 there is a homeland security trust authority server 28*f* that functions to verify information submitted by applicants for a new document, retrieved from issued documents, or obtained directly from a document presenter with information stored in databases on a secure government network 29, whether that network is a state or federal network. The servers 30–39 for different government agencies are each connected via a gateway 38*a*–*i* to the secure government network 29 and are presently used for inter-agency access to data stored in databases on the servers connected to network 29. Trust authority server 22 provides secure, privacy controlled access to information in the databases on servers 30–39 to verify issued documents or their presenters, to verify the identity of document applicants, and to determine if there are any other known concerns about a document applicant, issued document or its presenter. In this way of privacy concerns are adequately met.

To increase the effectiveness of the system the databases of foreign governments may be accessed via secure communications links and foreign trust authority servers 26,27 to obtain secure, privacy controlled access to information and/or verification of authenticity of a document or its presenter, and to determine if there are any known concerns by the foreign government about the document or its presenter.

Similarly, the databases of the fifty states may be accessed via secure communications links and state agency trust authority servers 23,24 to obtain secure, privacy controlled access to information, to verify the identity of a document applicant, verify the authenticity of an issued document or its presenter, and to determine if there are any other known concerns by a state agency about a document applicant, an issued document or its presenter. This might be necessary if the identity of a document applicant or document presenter is in doubt and they are asked questions, the answers to which are compared to information from a state database in an attempt to verify if the document applicant or document presenter is the person they claim to be. While direct access to state agency trust authority servers is shown, state agency servers having database may be connected to a secure government network that is accessed via a single trust authority server, such as the U.S. government secure network accessed using trust authority server 22.

Also, private databases of organizations or businesses such as, but not limited to, health providers and banks may be accessed via secure communications links and a trust authority server 25 to obtain secure, privacy controlled access to information of a document applicant or document presenter that may be needed to verify their identity. This might be necessary if the identity of a document applicant or document presenter is in doubt and they are asked personal questions the answers to which are compared to information from a private database in an attempt to verify if the document applicant or document presenter are the person they claim to be.

Figure 2:
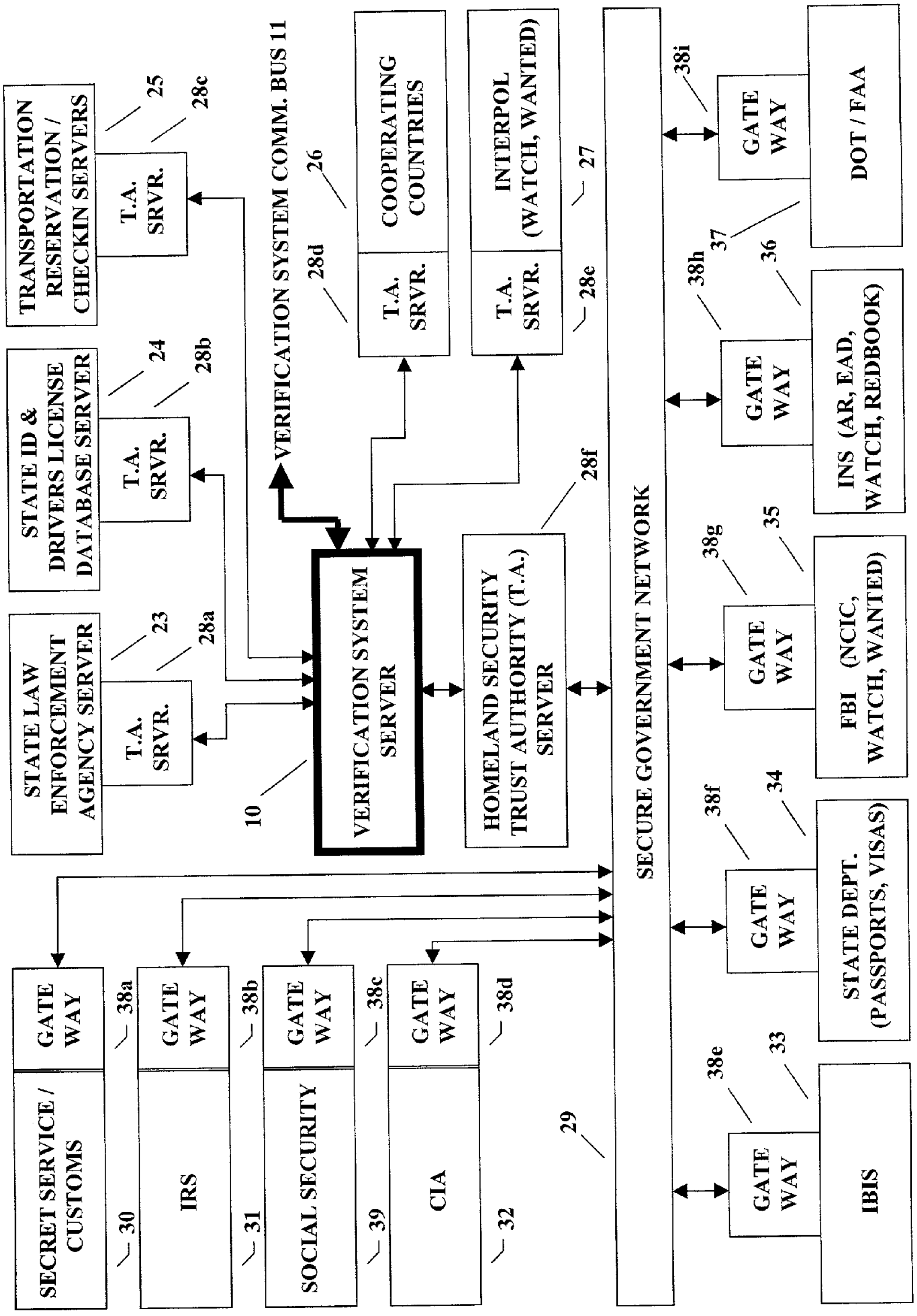
FIG. 2 is a more detailed block diagram of an information and document verification system utilizing trust authorities to access federal, state, private and foreign databases in a secure, private manner to verify information submitted when applying for documents, and to verify issued documents and individuals to whom they are issued.

In FIG. 2 is a more detailed block diagram of a verification system utilizing trust authorities to access federal, state, private and foreign databases via trust authority servers in a secure manner to verify document applicants, issued documents and individuals to whom the documents are issued, while addressing privacy concerns. In FIG. 1 is verification system server 10 and verification system communication bus 11 described in the previous paragraphs with reference to FIG. 1. As previously described, server 10 determines which trust authority servers are to be accessed in a secure manner as part of the operation of a document verifier terminal 12 or a document creation terminal 13 in verifying source information from document applicants, issued documents and document presenters. In addition, in some cases, an individual database, such as on transportation reservation/check-in system servers 25, may not have its own trust authority server and verification system server 10 may act as its trust authority, if a trust authority is required. All databases requiring a trust authority are accessed via their respective trust authority server 23–28, and they are all connected to server 10. All communication paths between these servers are preferably secure communication channels, not accessible from the outside, and over which all communications are encrypted. As previously mentioned information passes between server 10 and all trust authority servers 28, and decisions made at either server 10 or ones of servers 28, is done in a manner to protect privacy of a document applicant at a document creation terminal 13 or document presenter at a document verifier terminal 12.

Shown connected to verification system server 10 in FIG. 2 are four types of trust authority servers. There are state agency databases, such as state law enforcement agency server 23 and state driver's license server accessed via trust authority server 28*a*, and identification card trust authority server 24 accessed via trust authority server 28*b*. There are also private databases such as transportation reservation/check-in server 25 that is accessed by trust authority server 28*c*. Examples of other types of private database servers, not shown, that might be connected to verification system server 10 are credit card database servers and medical record database servers.

As shown in FIG. 2, each of the database servers 23–27 & 30–39 are accessed via a trust authority server 28*a*–28*f* but, as previously described, all database servers within a particular group of servers, such as for a particular state, may be connected to a common secured state network and a single trust authority server is utilized to access the secured state network to access the state database servers to verify source information from a document verifier terminal 12.

The U.S. government interconnects its database servers using one or more networks, such as secure government network 29. As shown in FIG. 2 there are nine database servers connected to secure government network 29 via gateways. The gateways are used to provide access to their associated database server only to authorized individuals, groups or agencies. Shown are a secret service/customs database server 30 with a gateway 38*a*, an IRS database server 31 with a gateway 38*b*, a Social Security database server 39 with a gateway 38*c*, a CIA database server 32 with a gateway 38*d*, an IBIS database server 33 with a gateway 38*e*, a State Department database server 34 with a gateway 38*f*, an FBI database server 35 with a gateway 38*g*, an Immigration and Naturalization Service (INS) database server 36 with a gateway 38*h*, and a DOT/FAA database server 37 with a gateway 38*i*.

For the purposes of this invention homeland security trust authority server 22 is permitted access to all database servers 30–39 connected to secure government network 29. As previously described, such access to government database servers is typically only for the purpose of comparing information stored in a government database with stores information from a document or the document presenter at a document verifier terminal 12 and returning an indication that the comparison indicates a "match" or "no match". In this manner privacy concerns are adequately addressed.

As previously described, there are certain types of information, or certain conditions under which certain types of information may not be compared at trust authority server 22 but, instead, be forwarded directly to verification system server 10 and thence to a document creation terminal 13 or a document verifier terminal 12 for the sole purpose of verifying the document applicant, document or its presenter. No direct connections between server 10 and a database are shown.

Figure 3:
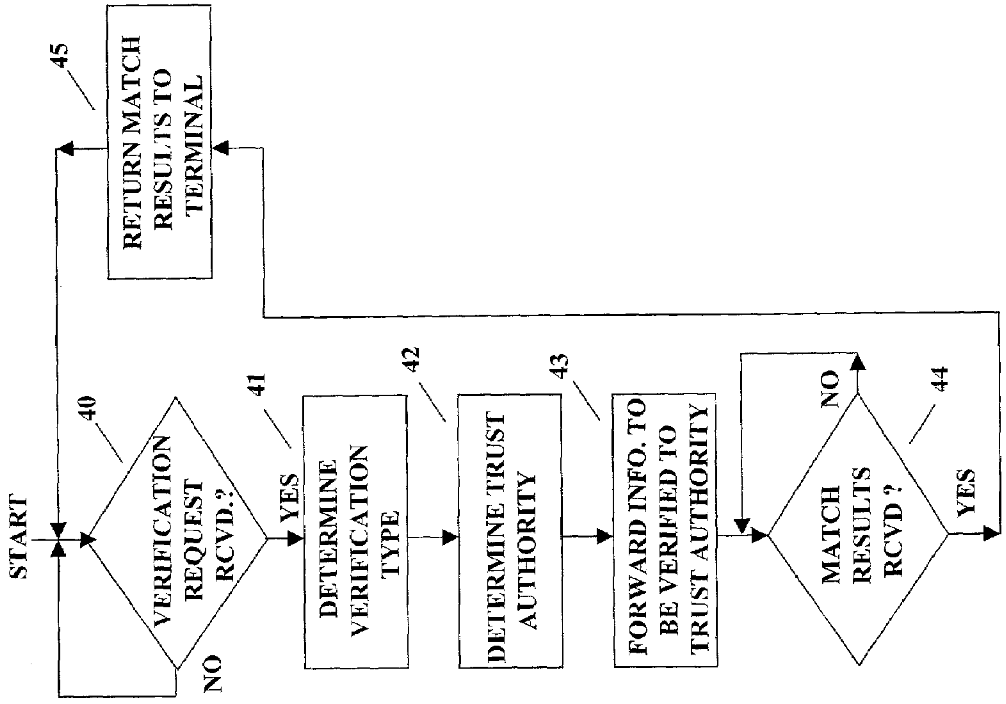
FIG. 3 is a block diagram of the operations performed by a verification system server in functioning with a trust authority server to verify information submitted when applying for documents, and to verify issued documents and document bearers.

FIG. 3 shows a block diagram of the program operations performed in verification system server 10 to have source information obtained from document applicants, issued documents and document presenters verified by trust authority servers. At the start of the program, at block 40 the program is awaiting a request from one of a plurality of document verifier terminals 12 and document creation terminals 13 connected to it via bus 11 to verify source information obtained from a document applicant, issued document or a document presenter. When such a request is received, the program progresses to block 41.

At block 41, server 10 analyzes the source information verification request to determine the type of information to be verified. Using this determination the program progresses to block 42 where server 10 selects which of the many trust authority servers shown in FIG. 2 are to be accessed to verify the source information received from a terminal 12 or 13. Using the results of the trust authority determination, verification system server 10 forwards the source information to the selected trust authority server. If, for example, fingerprint information has been retrieved from a document applicant, issued document or a document presenter at a terminal 12 or 13, verification system server 10 determines that the verification request should be forward to homeland security trust authority server 22 with which the FBI fingerprint database server 38*g* is associated.

At block 44 the program awaits the receipt of match results from the selected trust authority server to which the source information was forwarded. Using the fingerprint example in the previous paragraph, when trust authority server 28*f* has completed a fingerprint comparison the results of the comparison are returned to verification system server 10. Upon the receipt of the fingerprint comparison results the program exits block 44 at YES and progresses to block 45 where the results of the fingerprint comparison are returned to the terminal 12 or 13 that originally requested the fingerprint verification. At terminal 12 or 13 the fingerprint comparison information is used to verify the document applicant, issued document or document presenter from which the fingerprint information was initially obtained. The program then returns to block 40 to await another information verification request from a terminal 12.

Figure 4:
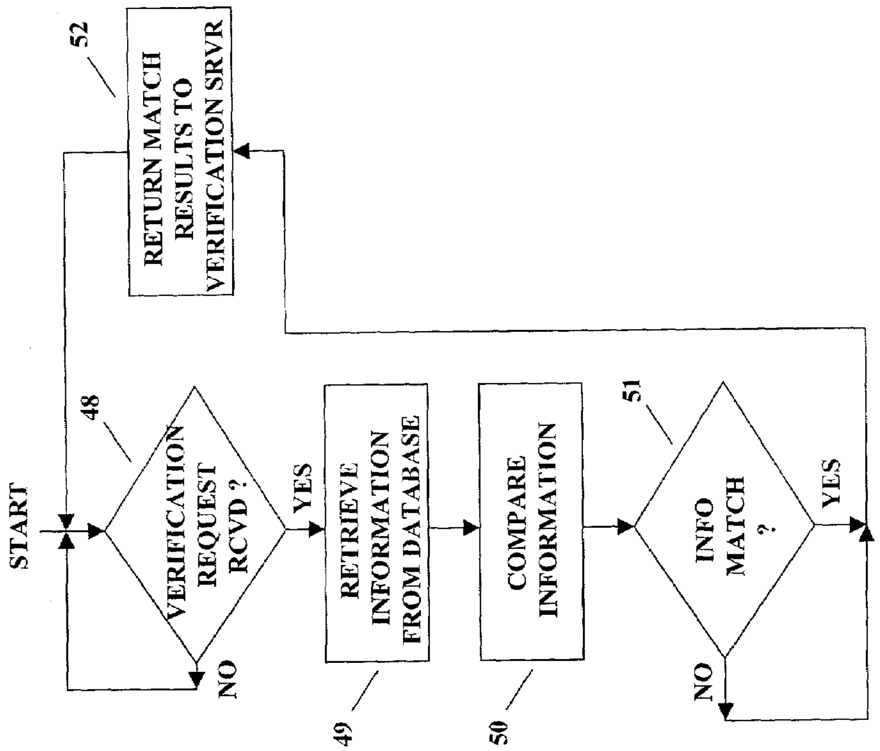
FIG. 4 is a block diagram of the operations performed by a trust authority server in functioning with a verification system server to verify information submitted when applying for documents, and to verify issued documents and document bearers.

FIG. 4 shows a block diagram of the program operations performed in a trust authority server to retrieve information from databases associated with the trust authority servers to verify source information forwarded from a verification system server 10. At the start of the program, at block 48 the trust authority server program is awaiting receipt of a verification request and source information from a verification system server 10 to verify the source information. When such a verification request is received, the program progresses to block 49.

At block 49 the selected trust authority server program retrieves the appropriate information from its associated database. At block 50 the program compares the information retrieved from the database with the source information. At block 51 the program determines if the information comparison has resulted in a "match" or "no match" decision. At block 52 the result of the information comparison made at block 51 is returned to verification system server 10 where the results of the information comparison are returned to the terminal 12 that originally requested the source information verification. The program then returns to block 48 to await another source information verification request from a verification system server 10.

Using the fingerprint comparison example given above, the homeland security trust authority server 28*f* must issue a request over secured government network 29 to gateway 38*g* for the fingerprints of the document presenter. Server 28*f* compares the retrieved fingerprint with the source fingerprint and returns the result of this comparison to verification system server 10 that forwards the results to the terminal 12 or 13 that originally generated the fingerprint source information verification request.

While what has been described hereinabove is the preferred embodiment of the invention it will be obvious to those skilled in the art that numerous changes may be made without departing from the spirit and scope of the invention. For example, one trust authority server has been described as being associated with each database server, but it should be understood that a single trust authority server may be associated with and compare information obtained from documents or persons to information stored in more than one database server.

The invention claimed is:

1. A method for verifying biometric and/or other information obtained from persons and/or from documents to verify the identity of the persons and/or the validity of the documents, while protecting the privacy of the persons, where there are a plurality of databases with information about the persons and the documents, said method comprising the steps of:

identifying the ones of the plurality of databases that contain information necessary for verifying the obtained information;

comparing the information from the identified databases with the obtained information to verify the latter without disclosing database information to anyone; and providing an indication whether or not the obtained information matches the information from the identified databases.

2. The method in accordance with claim 1 wherein the obtained information is obtained from a source and further comprising the step of forwarding the information match indication to the source.

3. The method in accordance with claim 2 further comprising the step of forwarding the obtained information to a remote location where the information comparing step takes place.

4. The method in accordance with claim 2 wherein a person provides the obtained information in order to obtain a document, and the obtained information is verified during the information comparing step to verify the identity of the last mentioned person before the last mentioned document is issued to that person.

5. The method in accordance with claim 2 wherein a person provides an issued document and the obtained information to be verified is obtained from that person and from the issued document they provide.

6. The method in accordance with claim 1 wherein a person provides the obtained information in order to obtain a document, and the obtained information is verified during the information comparing step to verify the identity of the last mentioned person before the last mentioned document is issued to that person.

7. The method in accordance with claim 1 wherein a person provides an issued document and the obtained information to be verified is obtained from that person and from the issued document they provide.

8. The invention in accordance with claim 2 wherein a person provides an issued document and the obtained information to be verified is obtained from that person and from the issued document they provide.

9. The invention in accordance with claim 8 further comprising means for obtaining the information from persons and documents and wherein the information match indication provided by said indication providing means is forwarded to the database identifying means that in turn forwards the information match indication to the information obtaining means that provided the obtained information.

10. Apparatus for verifying biometric and/or other information obtained from persons and/or from documents, to verify the identity of the persons and/or the validity of the documents, while protecting the privacy of the persons, where there are databases with information about the persons and the documents, said apparatus comprising:

means for identifying the databases that contain information necessary for verifying the obtained information;

means for comparing the information from the identified databases with the obtained information to verify the latter without disclosing database information to anyone; and means for providing an indication whether or not the obtained information matches the information from the identified databases.

11. The invention in accordance with claim 10 further comprising means for obtaining the information from persons and documents and wherein the information match indication provided by said indication providing means is forwarded to the database identifying means that in turn forwards the information match indication to the information obtaining means that provided the obtained information.

12. The invention in accordance with claim 11 wherein the comparison means is located remote from the database identifying means.

13. The invention in accordance with claim 10 wherein a person provides the obtained information in order to obtain a document, and the obtained information is verified by the comparing means to verify the identity of the last mentioned person before the last mentioned document is issued to them.

14. The invention in accordance with claim 13 further comprising means for obtaining the information from persons and documents and wherein the information match indication provided by said indication providing means is forwarded to the database identifying means that in turn forwards the information match indication to the information obtaining means that provided the obtained information.

15. A method for verifying biometric and/or other information obtained from persons and/or from documents to verify the identity of the persons and/or the validity of the documents, while protecting the privacy of the persons, where there are databases with information about the persons and the documents, said method comprising the steps of:

obtaining information from persons and/or from documents from at least one terminal;

identifying the databases that contain information necessary for verifying the obtained information;

forwarding the obtained information to one or more servers that have access to the information in the identified databases;

comparing the information from the identified databases with the obtained information in the server to verify the obtained information without disclosing database information to anyone;

providing an indication whether or not the obtained information matches the information from the identified databases; and returning the match indications to the terminal from which the obtained information that was compared to database information was originally sent.

16. The method in accordance with claim 15 wherein a person at a terminal provides the obtained information in order to obtain a new document, and the obtained information is verified during the information comparing step to verify the identity of the last mentioned person before the new document is issued to that person.

17. The method in accordance with claim 16 wherein the databases are locations remote from the terminals.

18. The method in accordance with claim 15 wherein a person at a terminal provides an issued document and the obtained information to be verified is obtained from that person and from the issued document they provide.

19. The method in accordance with claim 18 wherein the databases are locations remote from the terminals.

20. Apparatus for verifying biometric and/or other information obtained from persons and/or from documents, to verify the identity of the persons and/or the validity of the documents, while protecting the privacy of the persons, where there are databases with information about the persons and the documents, said apparatus comprising:

at least one terminal at which information is obtained from persons and/or from documents;

an information verification server for identifying the databases that contain information necessary for verifying the information obtained at ones of the terminals;

at least one trust authority server associated with at least one of the databases, and the obtained information is forwarded via the information verification server to the trust authority server associated with the identified databases, and the trust authority server compares the obtained information forwarded to it to verify the obtained information without disclosing database information to anyone; and wherein the trust authority server provides an indication whether or not the obtained information matches the information from the identified databases, and the information match indication is returned via the information verification server to the terminal from which the obtained information was originally sent for verification.

21. The invention in accordance with claim 20 wherein a person at a terminal provides the obtained information in order to obtain a new document, and the obtained information is verified by the trust authority server before the new document is issued to that person.

22. The invention in accordance with claim 20 wherein a person at a terminal provides an issued document and the obtained information to be verified is obtained from that person and from the issued document they provide.

23. A method for verifying biometric and/or other information obtained from persons and/or from documents to verify the identity of the persons and/or the validity of the documents, while protecting the privacy of the persons, where there are multiple databases with information about the persons and the documents, said method comprising the steps of:

identifying the ones of the multiple databases that contain information necessary for verifying the obtained information;

forwarding the obtained information to one or more servers that have access to the information in the identified databases to verify the obtained information without disclosing database information to anyone; and receiving an indication from the one or more servers indicating whether or not the obtained information matches the information in the identified databases.

24. A method for verifying biometric and/or other information obtained from persons and/or from documents to verify the identity of the persons and/or the validity of the documents, while protecting the privacy of the persons, where there are multiple databases with information about the persons and the documents, said method comprising the steps of:

receiving a request at one or more servers that have access to information in ones of the multiple databases needed to verify the information obtained from the persons and/or from the documents without disclosing database information to anyone;

comparing the obtained information with information in the last mentioned ones of the multiple databases at the one or more servers to verifying the obtained information; and forwarding an indication from the one or more servers whether or not the obtained information matches the information in any of the multiple databases.

25. A computer readable medium containing computer executable instructions for verifying biometric and/or other information obtained from persons and/or from documents to verify the identity of the persons and/or the validity of the documents, while protecting the privacy of the persons, where there are multiple databases with information about the persons and the documents, the executable program instructions comprising program instructions for:

identifying ones of the multiple databases that contain information necessary for verifying the obtained information;

comparing the information from the identified databases with the obtained information to verify the latter without disclosing database information to anyone; and providing an indication whether or not the obtained information matches the information from the identified databases.

26. A computer readable medium containing computer executable instructions for verifying biometric and/or other information obtained from persons and/or from documents to verify the identity of the persons and/or the validity of the documents, while protecting the privacy of the persons, where there are multiple databases with information about the persons and the documents, the executable program instructions comprising program instructions for:

obtaining information from persons and/or from documents from at least one terminal;

identifying the ones of the multiple databases that contain information necessary for verifying the obtained information;

forwarding the obtained information to one or more servers that have access to the information in the identified databases;

comparing the information from the identified databases with the obtained information in the server to verify the obtained information without disclosing database information to anyone;

providing an indication whether or not the obtained information matches the information from the identified databases; and returning the match indications to the terminal from which the obtained information that was compared to database information was originally sent.

* * * * *